A. T. & O. F. McHARGUE.
DISH WASHER AND DRAINER.
APPLICATION FILED NOV. 25, 1910.

1,001,059.

Patented Aug. 22, 1911.

WITNESSES
G. M. Sprung
L. E. Barkley

INVENTORS:
Alma T. McHargue &
Oscar F. McHargue,
by Frank S. Addleman, Attorney

UNITED STATES PATENT OFFICE.

ALMA T. McHARGUE AND OSCAR F. McHARGUE, OF COLUMBUS, MONTANA.

DISH WASHER AND DRAINER.

1,001,059.  Specification of Letters Patent.  Patented Aug. 22, 1911.

Application filed November 25, 1910. Serial No. 594,097.

*To all whom it may concern:*

Be it known that we, ALMA T. McHARGUE and OSCAR F. McHARGUE, citizens of the United States of America, and residents of Columbus, in the county of Yellowstone and State of Montana, have invented certain new and useful Improvements in Dish Washers and Drainers, of which the following is a specification.
This invention relates to washing apparatus and particularly to a dish washer and drainer.

An object of this invention is to provide an apparatus in which dishes are subjected to the action of liquid while the said liquid is being agitated through the action of an oscillatory member adapted to support a container for the liquid and dishes.

Furthermore, an object of this invention is to provide a container, a bracket or arm for supporting the container and means associated with the bracket or arm for bracing the container and preventing its dislodgment when the said bracket is being manipulated.

Furthermore, an object of this invention is to produce article holders adapted to fit within the container, the said article holders comprising baskets or open mesh receptacles for containing plates and other dishes or table cutlery which are to be subjected to the action of the liquid within the container the said holder being capable of being bodily removed from the container with the contents so that the contents may be carried to places convenient for their distribution.

With the foregoing and other objects in view, the invention consists in the details of construction and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1:
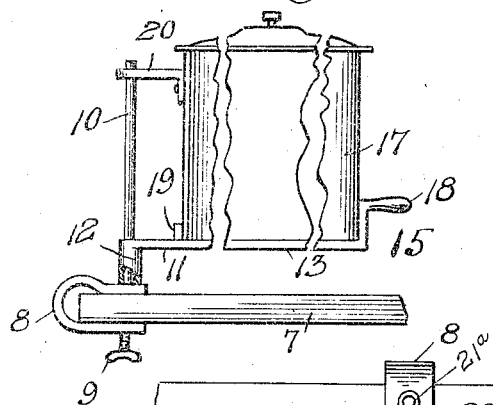
Figure 2:
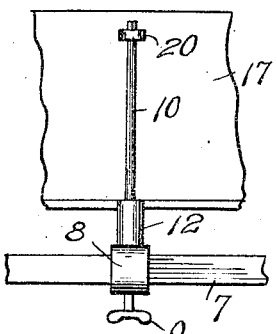
Figure 3:
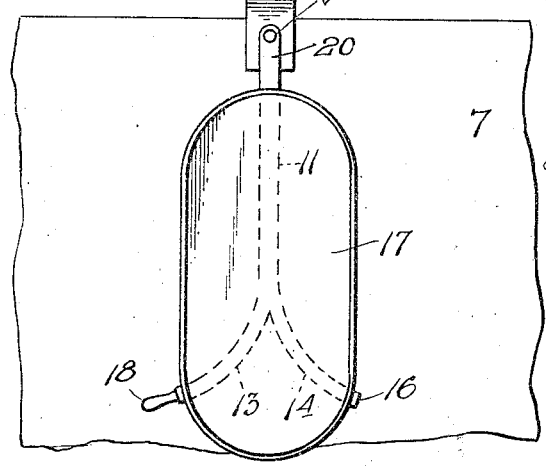
Figure 4:
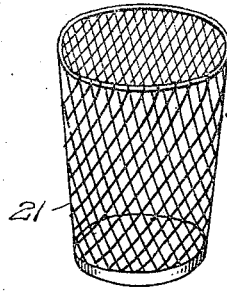
Figure 5:
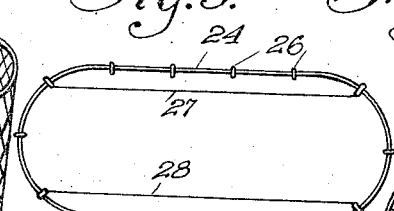
Figure 6:
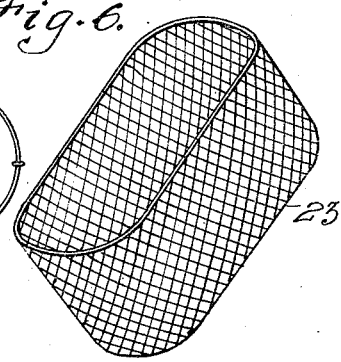

Figure 1 illustrates a view in elevation of the apparatus applied to a base board; Fig. 2 illustrates an end view of a fragment of the apparatus; Fig. 3 illustrates a top plan view thereof; and Figs. 4, 5 and 6 illustrate perspective views of holders designed to be applied to the container.
In these drawings 7 denotes a base having a clamp 8 thereon, the said clamp having a thumb screw 9 which is adapted to be secured in the clamp for the purpose of binding against the base 7. The clamp is further provided with a pivotal rod 10 which rises therefrom vertically.

Associated with the clamp and rod 10 is a bracket having an arm 11 terminating at its rear end in a hub 12 which fits on the rod 10, the said arm being bifurcated at its outer end to form branches 13 and 14, each of which has near its end a shoulder 15 and 16 respectively for the purpose of forming an abutement for a container or receptacle 17, which is designed to receive liquid.

The branch 13 of the arm terminates in a handle 18 which may be grasped by an operator for the purpose of manipulating the arm by oscillating it on the rod 10. The arm 11 is also provided with a lug 19 which serves to confine the receptacle 17 and prevent its dislodgment from the shoulders 15 and 16. As a further means for retaining the receptacle 17 in operative relation to the rod 10, we provide the said receptacle with an arm 20 extending outwardly from its side and provided with an aperture 21ª to receive the rod 10. From an inspection of Fig. 1, it will be seen that as the hub 12 is partially rotated with respect to the rod 10, the arm 20 also turns on the said rod and thus the upper part of the receptacle is maintained in proper relation to the rod and prevented from dislodgment whereas the said receptacle is also steadied or held against vibration by the said arm.

The receptacle 17 is provided with a plurality of attachments such as the holders 21, 22 and 23, the former of which is of an ordinary basket-shaped construction and it has a solid bottom and is intended for the purpose of containing the table cutlery, knives and small articles. The holder 23 is preferably of wire mesh and is designed as a general purpose basket, that is to say, any of the dishes or cutlery articles may be placed in it when they are to be subjected to the action of the liquid within the container and it has been found in practice that the holder 21 may be placed in the holder 23 and that dishes or other articles may be placed around the holder 21, thus permitting the silverware and dishes to be washed at the same time, yet retaining the silverware and cutlery separate from the dishes 11 and providing means for the removal of all of the silverware and cutlery by the simple removal of the holder 21.

Figure 7:
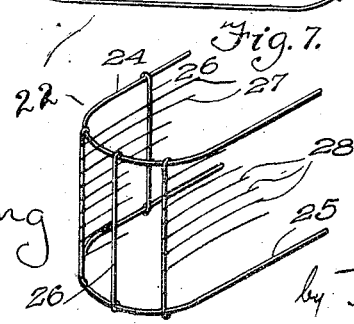

The holder 22 is designed exclusively for use as a rack for plates which are to be subjected to the action of liquid within the container and as shown in Fig. 7 we provide an elliptical frame comprising a top member 24, a bottom member 25 and a series of vertically disposed ribs 26. One side the holder is without the vertically disposed ribs and it is from this side that the plates are applied to the rack. As shown in the drawings, a series of longitudinally disposed wires 27 (or rods may be used, though the term "wires" will hereafter be employed by which is meant rods, wires or other supporting members,) extend from one of the end ribs to another of the end ribs, parallel with the sides of the holder, but they stand a slight distance from the said sides in order to accommodate the edges of the plates between the wires on which the plates are supported and the said sides of the holder. There is another series of wires 28 opposite the wires 27, the said wires 28 having their ends also secured to ribs at the ends of the holder. The wires of the rack are curved vertically to correspond with the general contour of a cross section of a plate. The last mentioned series of wires is on a slightly higher plane than the first mentioned series and a plate applied to the lowermost wire of one series and to the lowermost wire of the other series will be supported in an inclined position and plates applied to the next succeeding wires of the two series will also be on an incline, so that the two series of wires produce a rack which will support a plurality of plates, in inclined positions, and as the racks are arranged so that the plates are inclined toward that side of the holder having the ribs the plates are prevented from being dislodged from the rack by their engagement with the ribs.

The purpose of the inventors is to provide this plate rack in order that the plates may be placed in the holder by inserting the plates between the longitudinally disposed wires on one side and having them extend downwardly or diagonally across the holder into engagement with wires on a lower plane on the opposite side of the holder. As stated, the plates are held in an inclined position and this arrangement permits their draining after having been subjected to the action of liquid within the container.

It has been found in practice that the apparatus heretofore described proves unusually efficient in washing and drying dishes in that the peculiar motion of the receptacle carried by the oscillating bracket or arm agitates the water within the receptacle so that the force of the water against the contents of the receptacle will be such as to remove any deposits from the dishes and leave them free of grease and particles of food, after which the said dishes are allowed to drain by removing the holders from the receptacles and as the heat of the liquid leaves the dishes and other articles in a heated state, they quickly dry upon their being removed from the container.

We claim—

In a dish washer, a clamp, a rod thereon, an arm having a hub mounted on the rod, branches on the said arm, a lug on the arm, shoulders on the branches, a receptacle confined between the lug and the shoulders, an arm on the receptacle engaged by the rod, and article holders comprising open mesh receptacles adapted to be applied to the first mentioned receptacle.

In testimony whereof, we hereunto affix our signatures in the presence of two witnesses.

ALMA T. McHARGUE.
OSCAR F. McHARGUE.

Witnesses:
Mrs. Thos. S. Davis,
Edgar F. Parks.